July 21, 1942.  A. J. TURPIN  2,290,783
REGULATOR VALVE FOR FLUIDS
Filed May 1, 1941  2 Sheets-Sheet 1

INVENTOR.
ALEXANDER J. TURPIN
BY
ATTORNEY.

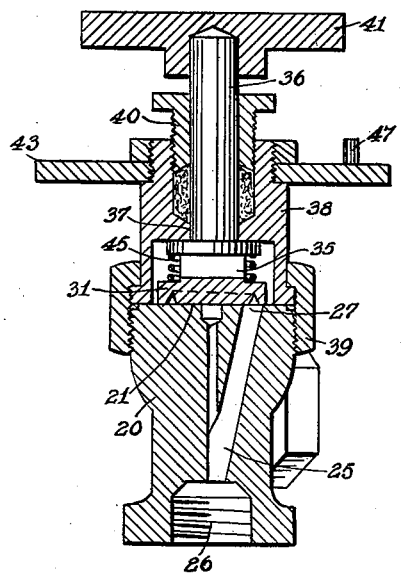
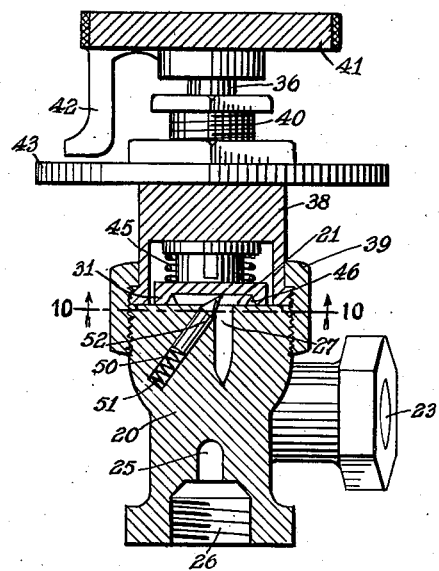
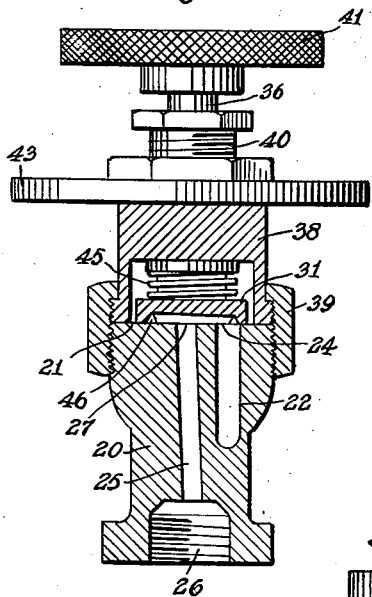
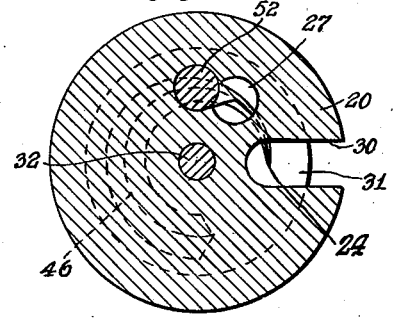
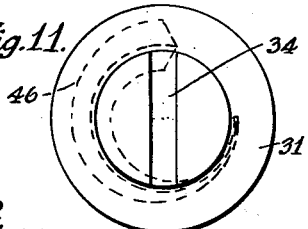
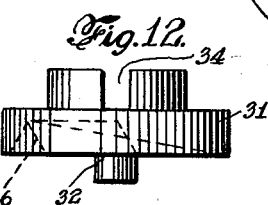

Patented July 21, 1942

2,290,783

UNITED STATES PATENT OFFICE 2,290,783

REGULATOR VALVE FOR FLUIDS

Alexander J. Turpin, Stewart Manor, N. Y., assignor to Hauck Manufacturing Company, Brooklyn, N. Y., a corporation of New York Application May 1, 1941, Serial No. 391,226

3 Claims. (Cl. 251—86)

The invention relates to fluid valves, more especially of the type designed for regulation of the volume of fluid as supplied therethrough.

The invention has for an object a novel construction of control means for use therein whereby to vary progressively the volume of flow in accordance with the position of an element relatively movable with respect to a pair of ports adapted to be placed in communication with each other thereby.

A further object of the invention is to provide a novel mounting for such control element.

Still another object is to provide cleaning means for the said communication so associated with the control element as to become effective for removal of foreign matter upon its adjustment from one position to another.

In carrying out the invention, a valve disk or like element is associated with two ports preferably disposed circularly in a seat for the disk, one for introducing fluid to and the other for delivering the same from the valve, said disk being held to the seat and provided on its surface juxtaposed to the said ports with a groove of progressively increasing cross-sectional area designed to afford communication between the two ports when a relative adjustment is effected between the said disk and ports. In addition, there is located adjacently one of the ports, as the outlet port, a spring-urged cleaning element movable outwardly toward the said groove to engage the same permanently and movable relatively with respect to the said groove as the control element is adjusted. This maintains at all times the said groove from the inlet to said cleaning element free and clear of any foreign matter as well as sealing the remainder of the groove against obstruction by such matter.

The nature of the invention, however, will best be understood when described in connection with the accompanying drawings, in which.

Figure 1:
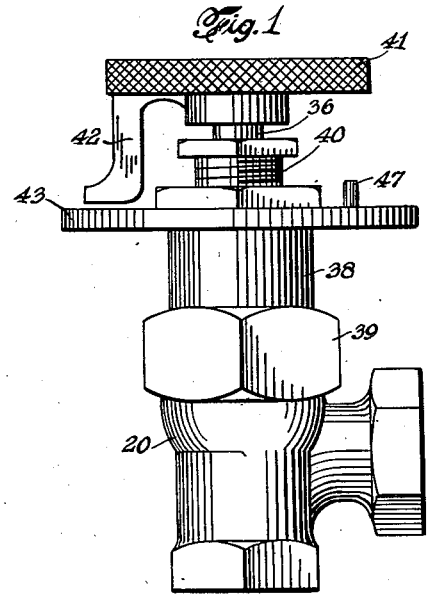
Fig. 1 is a front elevation of the novel valve.
Figure 3:
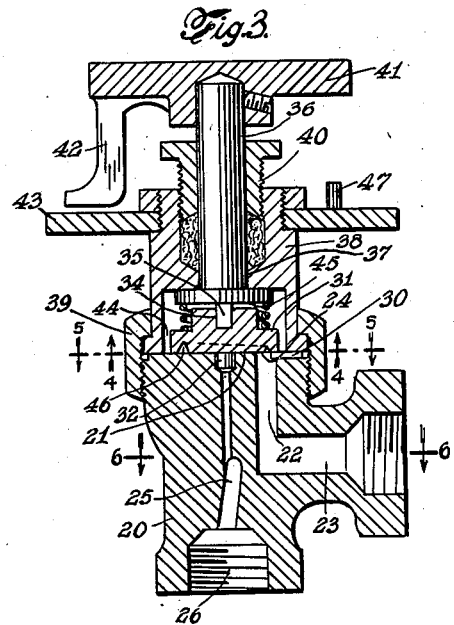
Fig. 3 is a vertical section through the valve.
Figure 2:
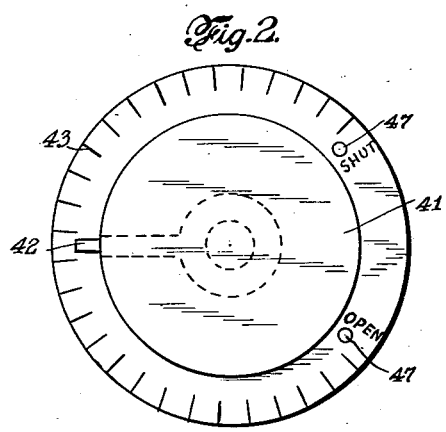
Fig. 2 is a plan thereof.
Figure 4:
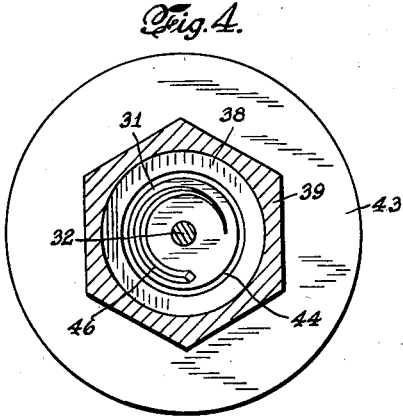
Figure 5:
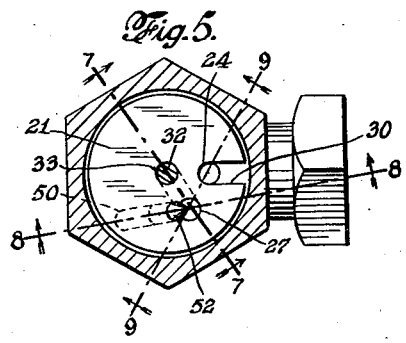
Figure 6:
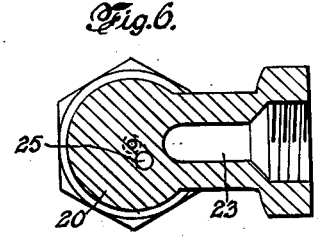

Figs. 4, 5, and 6 are transverse sections through the valve taken respectively on the lines 4—4, 5—5, and 6—6, Fig. 3 of the drawings, and looking in the direction of the arrows.

Figs. 7, 8, and 9 are vertical sections through the valve taken respectively on the lines 7—7, 8—8, and 9—9, Fig. 5 of the drawings, and looking in the direction of the arrows.

Fig. 10 is a fragmentary horizontal section showing on an enlarged scale the valve seat, said section being taken on the line 10—10, Fig. 8 of the drawings and looking in the direction of the arrows.

Fig. 11 is an enlarged plan view of the valve piece utilized in the novel valve, and Fig. 12 is a front elevation thereof.

Referring to the drawings, 20 designates a solid body portion of the valve, the same affording, for example at the top, a flat seat 21. This body portion is bored through as at 22 to provide a passageway having at one end an inlet 23 for the fluid to be controlled by the valve and terminating at the other end in an inlet port 24 in the seat 21.

Similarly, the body is bored as at 25 to provide a passageway having an outlet 26 from the valve, the bored portion terminating at the valve seat in an outlet port 27. These ports are preferably arranged circularly in the seat, and there is provided in addition and below the plane of port 24 a by-pass or equalizing passageway 30 for conveying a portion of the incoming fluid above the seat 21 and a valve piece 31 associated therewith for relative movement thereover. This valve piece may be in the nature of a rotatable valve disk ground to fit tightly the seat and centered in the body portion 20 as by means of an axial pin 32 extending from its under surface into a corresponding socket 33 of the body portion.

In its upper reduced-diameter portion the disk is provided with a transverse groove 34 adapted to receive a tongue 35 extending axially from the flanged inner end of a valve stem or spindle 36. This stem extends outwardly through an opening 37 of a suitable enclosing member or bonnet 38 for the valve disk and seat. The said enclosing member is designed to be suitably coupled to the body portion as by means of the nut 39, and the stem 36 is sealed by a stuffing box 40, said stem projecting beyond the enclosing member and having secured to its outer end a suitable operating handle or wheel 41. The latter carries an indicator element or pointer 42 movable over a graduated dial 43 attached to the top of the enclosing member. By this expedient, relative movement may be effected between the seat 21 and disk 31 as by rotating the latter over the seat, its particular angular position being readable on the dial 43.

As indicated, a certain amount of clearance 44 is provided about the disk 31 so that the by-pass 30 may deliver fluid above said valve disk, tending thereby to retain the latter to its seat, the disk being of the floating type. Its position may be further insured by a spring 45 coiled about the upper portion of said disk between its lower flanged portion and the inner flanged portion of the stem 36.

The said disk 31 is designed, in accordance with the invention, to control the communication between the two ports 24 and 27. To this end, said disk is provided, in the embodiment shown, on its under surface with an arcuate groove 46 preferably of triangular cross-section and varying in cross-sectional area from its one end to its opposite end, for example, tapering in the direction from the outlet port toward the inlet port. By this arrangement, different volumes of fluid may be caused to pass from the latter port to the former port in accordance with the particular angular location of the disk, as indicated on the dial 43.

Provision is made, furthermore, to limit the extent of this angular displacement of the valve disk, for example, by means of fixed pins 47 extending upwardly from the dial 43 adapted for engagement with the pointer 42 in its excursion over the said dial. The arrangement is such that the flow may be controlled from a complete interruption thereof to the maximum for which the valve is designed, the delivery increasing progressively therebetween since the groove tapers towards the inlet port. A further advantage of this arrangement resides in the ability to associate with the said valve disk a cleaning element for the said groove of the disk, which element is continuously operative to remove any foreign matter tending to accumulate in the groove between the inlet port and said element as located in said groove.

Thus, there is provided in the body portion adjacent one of the ports, preferably the outlet port 27, an inclined socket 50 which at its outer end extends into said port 27. In this socket is mounted a spring 51 and a conically tipped plunger element 52 in advance of the said spring which urges the plunger outwardly to direct the same angularly into the line of travel of the groove of said disk for permanent engagement therein, as indicated more clearly in Fig. 8 of the drawings, the plunger end conforming substantially to its contour. As relative movement is had then between the disk and its seat, as in adjusting the groove for the desired flow of fluid therethrough, the pointed end of said plunger 52 will wipe the groove and will displace foreign matter therefrom into the outlet port so as to maintain at all times the communication between the two ports free and clear. Moreover, the unused or temporarily inactive portion of the groove behind the plunger is protected thereby from any deposit of foreign matter accumulating therein.

I claim:

1. A valve comprising a solid body portion provided with a seat having an inlet port and an adjacent outlet port, a disk movable over the surface and ports therein, provided on its under surface with a groove of varying cross-section and contiguous said ports to establish communication therebetween, means to effect relative movement between the disk and seat including enclosing means for the disk secured to the body portion and provided with an opening, together with a valve stem extending through said opening and at its inner end connected with said disk, and a cleaning element movably mounted in the seat adjacent one of the ports therein, spring-urged and directed into the line of travel of the groove of said disk to engage permanently therein for the wiping out from the same of any foreign matter as relative movement is effected between the disk and body portion to establish communication between the adjacent ports or to interrupt the communication therebetween.

2. A valve comprising a solid body portion provided with a seat having an inlet port and an adjacent outlet port, a disk movable over the surface and ports therein, provided on its under surface with a groove of varying cross-section and contiguous said ports to establish communication therebetween, means to effect relative movement between the disk and seat including enclosing means for the disk secured to the body portion and provided with an opening, together with a valve stem extending through said opening and at its inner end connected with said disk, and a pointed cleaning element movably mounted in a socket of the body portion adjacent the outlet port and inclined thereto to intersect the said port at the seat, a spring mounted in said socket behind the cleaning element urging the same outwardly into the line of travel of the groove of said disk to engage permanently therein for the wiping out from the same of any foreign matter to discharge said matter into said outlet port as relative movement is effected between the disk and body portion to establish communication between the adjacent ports or to interrupt the communication therebetween.

3. A valve comprising a portion provided with a seat having an inlet port and an adjacent outlet port, a disk movable over the surface and ports therein, provided on its under surface with a groove of varying cross-section and contiguous said ports to establish communication therebetween, and means to effect relative movement between the disk and seat including enclosing means for the disk secured to the said portion and provided with an opening, together with a valve stem extending through said opening and at its inner end connected with said disk, and a cleaning element projecting from the seat substantially at the outlet thereof and permanently into the line of travel of the groove of said disk for wiping out from the groove any foreign matter therein.

ALEXANDER J. TURPIN.